J. HOLLIS.
TROLLEY MECHANISM.
APPLICATION FILED NOV. 12, 1913.
1,146,877.
Patented July 20, 1915.
2 SHEETS—SHEET 1.
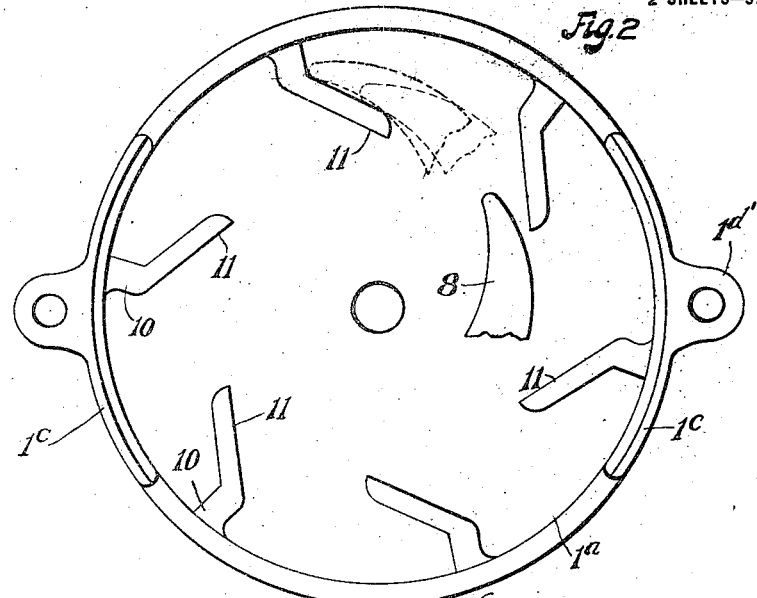
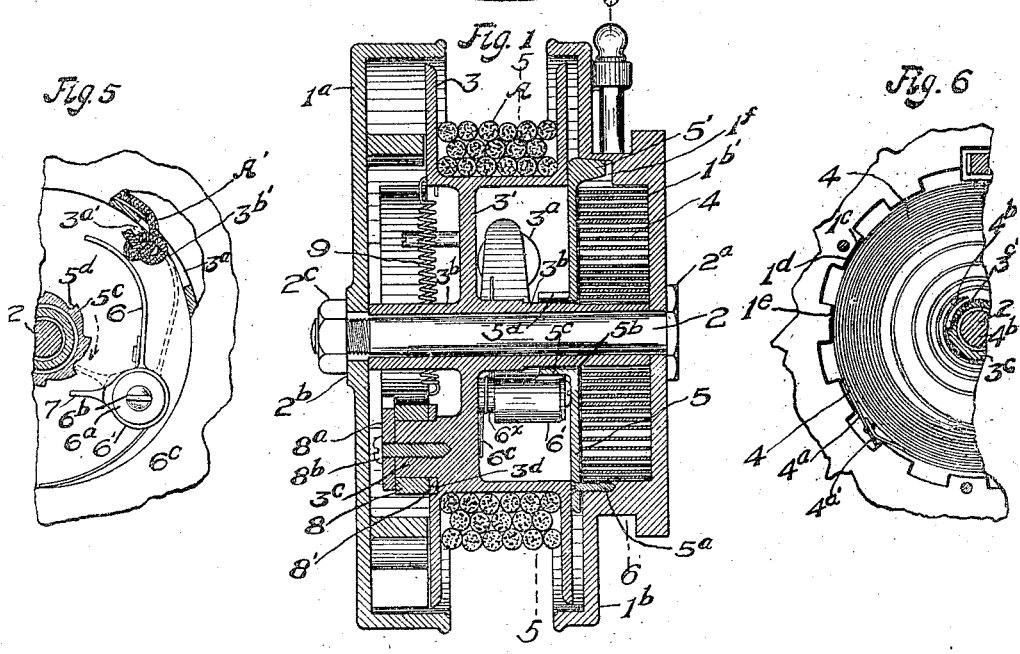
Witnesses:
Geo. B. Pitts
Richard Inglis.
Inventor
Joseph Hollis
Edward R. Alexander
Attorney.

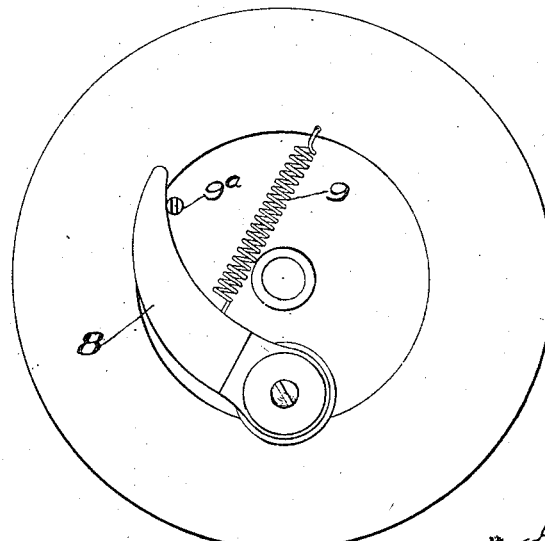
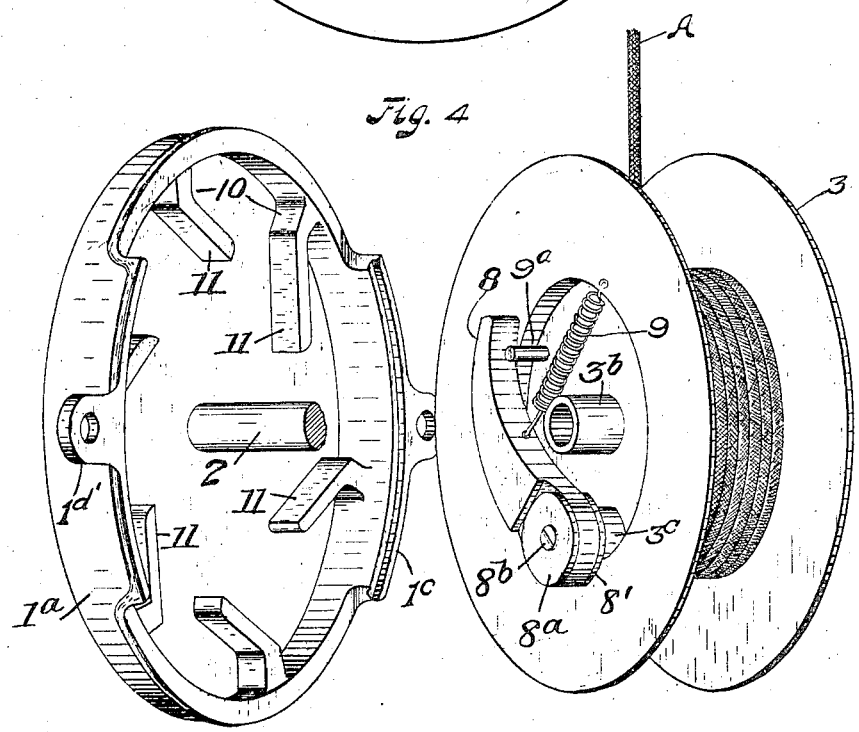

UNITED STATES PATENT OFFICE.

JOSEPH HOLLIS, OF CANTON, OHIO, ASSIGNOR TO JOHN E. McLAIN, OF CANTON, OHIO.

TROLLEY MECHANISM.

1,146,877.  Specification of Letters Patent.  Patented July 20, 1915.

Application filed November 12, 1913. Serial No. 800,504.

*To all whom it may concern:*

Be it known that I, JOSEPH HOLLIS, a citizen of the United States, residing at Canton, in the county of Stark and State of Ohio, have invented certain new and useful Improvements in and Relating to Trolley Mechanism, of which the following is a specification.

This invention relates to trolley mechanism for normally keeping the rope of a trolley pole substantially taut and for catching the trolley pole when it leaves the overhead wire.

One object of the invention is to provide improved means for maintaining the centrifugal pawl of the mechanism in operative position during the rebound of the trolley pole, whereby the pawl will be ready to catch the pole when it again swings upwardly.

Another object of the invention is to provide a mechanism of this character having few coöperative parts easily manufactured and adapted to be assembled and disassembled in a single and rapid manner.

Another object of the invention is to provide, in mechanism having one or more stops for catching the trolley pole upon leaving the overhead wire, one or more devices coöperating therewith to maintain the centrifugal pawl in operative position during the rebound of the trolley pole.

Other objects of the invention consist in the parts and combination of parts hereinafter described and illustrated and definitely referred to in the appended claims.

For the purpose of illustrating my invention, I have in the accompanying drawings shown and herein described one form of mechanism embodying it.

Figure 1 is a transverse sectional view of a trolley mechanism embodying my invention. Fig. 2 is an interior view of one of the casing members, with a fragmentary portion of the centrifugal pawl shown in full and dotted lines to illustrate its normal and operative positions, respectively. Fig. 3 is a side view of the drum. Fig. 4 is a perspective view of the casing member shown in Fig. 2 and the drum, detached. Figs. 5 and 6 are fragmentary views on the lines 4, 4 and 5, 5, respectively, of Fig. 1.

In the drawings, 1 indicates a casing preferably comprising two members $1^a$, $1^b$, adapted to house the mechanism for keeping the trolley rope A taut and catching the pole (not shown).

$1^c$ indicates arc shaped flanges formed integrally upon opposite sides of each member $1^a$, $1^b$, the flanges $1^c$ on one part being adapted to engage the flanges $1^c$ on the other part whereby said parts are interlocked together in a predetermined spaced position. Each member $1^a$, $1^b$, is also provided with apertured lugs $1^{d'}$ to receive suitable bolts (not shown) for detachably securing the members together.

2 indicates a shaft preferably disposed centrally of and supported at its opposite ends in the casing members $1^a$, $1^b$. The shaft 2 is preferably constructed in the form of a bolt having a head $2^a$ at one end and screw threads $2^b$ at its opposite ends to receive a nut $2^c$. This form of construction assists in holding the casing members together and also permits the easy assembly and disassembly of the trolley mechanism.

3 indicates a flanged drum on which the trolley rope A winds and unwinds in the manner to be hereinafter set forth. The upper end of the rope A is connected in a well known manner to the trolley pole. The drum 3 is provided with a web $3'$ and a hub $3^b$ which freely rotates on the shaft 2. The opposite ends of the hub $3^b$ preferably bear against the inner opposing faces of the members $1^a$, $1^b$, thus preventing movement of the drum longitudinally of the shaft 2.

$3^a$ indicates an opening formed in the rim of the drum 3.

$3^{a'}$ indicates a slot formed in the rim of the drum 3 and extending from one side of the opening $3^a$ in a circumferential direction. That end of the rope A, which is wound on the drum 3, is preferably knotted, as shown at $A'$ and inserted through the opening $3^a$. The rope A is then moved into the slot $3^{a'}$, the knot engaging the inner surface of the drum rim on opposite sides of the said slot and thereby connecting the rope A to the drum 3. Those surfaces of the drum rim 7 upon opposite sides of the slot $3^{a'}$ with which the knot $A'$ engages, are preferably inclined from the inner or closed end of the slot to its open end, as shown at $3^{b'}$. The purpose of this is to facilitate the removal and detachment of the rope from the drum. This is usually accomplished by unwinding the rope, and when its end is reached, the knot will automatically slide down the inclined surfaces 3^b' and free itself from the drum.

4 indicates a reel spring mounted in a circular recess or depression 1^b', which is preferably formed in the back or rear wall of the casing member 1^b. One end of this spring is adjustably anchored to the casing or wall of the recess 1^b' and its opposite end is detachably connected to the hub sleeve 3^b of the drum or reel 3, as will be later described. The spring 4 tends to rotate the drum 3 in an anti-clockwise direction (see dotted arrow in Fig. 5). Its function is to exert sufficient force on the drum to keep the rope A substantially taut and take up all slack, which may exist therein, between the drum 3 and the trolley pole during the normal operation of the device. When the rope A is wound on the drum 3, the force of the spring is expended, and when it is unwound therefrom, the spring is again placed under tension to operate the drum.

1^d indicates a series of inwardly projecting stops, having relatively wide faces 1^e, provided on the inner circumferential wall of the depression or recess 1^b'.

4^a indicates a strip of resilient metal, extending partly around the depression 1^b' and frictionally engaging with the faces 1^e of the stops 1^d. The outer end of the spring 4 is connected to the strip 4^a at a point removed from its front end, so as to leave a forwardly extended free end 4^a'. This free end 4^a' expands slightly outward and engages with the side wall of the adjacent stop 1^d, thus forming an anchor for the outer end of the said spring 4. In the event however the spring 4 is overwound, as may be the case when unwinding the rope A, such overwinding will result in drawing the forward extended end 4^a' of the strip 4^a inwardly slightly beyond the face 1^e of the adjacent lug 1^d and pulling or sliding the strip 4^a around the recess 1^b' until its forward extended end abuts against the next or succeeding stop 1^d. If the operation of winding up the spring 4 is continued, beyond a predetermined point, it will result in sliding the strip 4^a from one tooth to another, thereby preventing overwinding and breaking of the spring. It will thus be seen that the strip 4^a operates as a movable or adjustable connecting means between the outer end of the spring 4 and the casing member 1^b, which means obviates breakage of the spring by overwinding.

The connection between the inner end of the spring and the drum hub 3^b comprises a cam 3^c formed with a shoulder 3^c' fixed to or formed integral with that end of the hub 3^b which fits within the convolutions of the spring 4 and a plate 4^b fixed to the spring 4. The shoulder 3^c' on the cam 3^c is arranged to be engaged by the plate 4^b whereby the power of the spring 4 will rotate the drum 3 in an anti-clockwise direction. This construction permits the drum to be rotated in an anti-clockwise direction without affecting the spring 4. The construction is therefore of advantage when the mechanism is assembled and the rope for the first time is fixed to and wound on the drum. At this time the spring 4 is unwound; the knot A' is slipped through the opening 3^a and moved into the slot 3^a'. The drum may now be manually rotated until a sufficient length of the rope is wound thereon; if then the rope is unwound from the drum, such operation will wind up the spring 4. During the winding of the rope A on the drum 3, the connection between the hub 3^b and plate 4^b permits the drum to freely rotate anti-clockwise without affecting the spring 4. The tension of the spring 4 normally maintains the plate 4^b in the path of movement of the shoulder 3^c' thus making the connection between the spring 4 and drum 3 an operative one.

5 indicates a plate which is secured to the back of the casing member 1^b by suitable screws 5^a. This plate is preferably arranged to fit over and close the depression 1^b' formed in the back of the said member 1^b. It is formed with an opening 5^b through which the hub 3^b extends.

5' indicates a pin or projection which registers with and fits into an opening or recess 1^f in the casing member 1^b, whereby the said plate 5 may be properly positioned thereon.

5^c indicates a sleeve or collar, preferably formed integrally with the plate 5, and extending therefrom toward the web 3' of the drum 3.

5^d indicates a series of ratchet teeth provided on the outer circumferential wall of the collar 5^c.

6 indicates a plate swingably mounted at one end upon a suitable pivot or stud shaft 6^x projecting from the web 3' of the drum 3. The plate 6 is preferably provided with a hub 6' which forms a bearing member for the plate, the hub being held in place on the said shaft by a washer 6^a and screw or other locking device 6^b. The free end of the plate overlies the opening 3^a and slot 3^a' formed in the drum rim and is preferably curved at its free end to conform to the contour of the rim.

6^c indicates a spring, which may surround the shaft for the plate 6. One end or arm of the spring engages the said plate and yieldingly holds it in engagement with the inner surface of the rim immediately behind the opening 3^a therein.

7 indicates a pawl operated into and out of engagement with the ratchet teeth 5^d by the movement of the plate 6. The pawl 7 extends from and is preferably formed integrally with the hub 6' and is arranged to engage the teeth 5ᵈ when the plate 6 is in normal position against the drum rim, as shown in dotted lines in Fig. 5. The purpose of the pawl 7 is to prevent the unwinding of the spring 4 by locking the drum against rotation when the rope A is disconnected from the drum 3. Thus it will be understood that when the spring is wound and before the rope A has been connected to the drum 3, the spring 6ᶜ holds the plate 6 against the drum rim with the pawl 7 in engagement with the ratchet teeth 5ᵈ, then when the rope is connected to the drum, the act of inserting the knot A' through the opening 3ᵃ operates to swing the plate and simultaneously disconnect the pawl 7 from the adjacent tooth 5ᵈ. The drum 3 is then released and free to be rotated by the spring 4. Should it become necessary to disconnect the rope A from the drum 3 for any reason, the removal of the knot A' through the opening 3ᵃ permits the return of the plate 6 to normal position, thus automatically effecting a locking of the drum. By this construction it will be seen that after the parts are once assembled, the connection and disconnection of the trolley rope from the winding drum can take place as often as desired without the necessity of unwinding and rewinding the drum rotating spring.

8 indicates a pawl or dog carried by the drum 3 preferably on that side remote from the spring 4 and pivoted plate 6. The pawl 8 is swingably mounted on a stud shaft 3ᶜ preferably formed integral with the drum 3. The shaft 3ᶜ may be formed with a shoulder 3ᵈ on which is mounted a bushing 8' arranged to support the pawl to swing over the outer side face of the adjacent drum flange.

8ᵃ indicates a washer or end plate fitting over the outer end of the shaft 3ᶜ and 8ᵇ indicates a screw fitting an axial screw threaded opening in the shaft 3ᶜ and operating through the washer 8ᵃ to hold the pawl thereon.

9 indicates a spring, preferably of the coiled type, connected at one end to the pawl 8. At its opposite end, the spring 9 is connected to the drum 3. The spring 9 operates to normally draw or hold the free end of the pawl inwardly and against a stop 9ᵃ, which may be provided on the drum 3. However, when the drum 3 is rotated rapidly or suddenly, as for instance when the trolley pole leaves the overhead wire, the centrifugal force generated causes the free end of the pawl 8 to swing outwardly for a purpose to be later set forth, against the tension of the spring 9. The spring 9 is therefore of a suitable size and strength to permit such operation of the pawl 8 when the drum is rotated under the conditions just noted, but operates to hold in retracted position the pawl 8 as long as the trolley is in engagement with the overhead wire and the drum 3 is rotating under or against the influence of the spring 4 to take up the slack in or let out the rope A.

10 indicates a stop carried by the casing member 1ᵃ. I prefer to provide a series of stops 10 and to uniformly space them around the shaft 2 in the path of movement of the pawl 8. The devices 10 are preferably formed integral with the casing member 1ᵃ and extend inwardly from the side wall thereof and at right angles to its rear wall. The stops 10 are arranged to be engaged by the pawl 8 when the latter is swung outwardly. As long as the drum 3 is rotating under normal conditions and the trolley pole remains in engagement with the overhead wire, the pawl 8 will remain in normal position against the stop 9ᵃ. However, in the event the trolley pole leaves the overhead wire, the pole springs will thrust the pole upwardly with considerable force. The upward movement of the pole, acting through the rope A will impart a rapid rotation to the drum 3, which in turn will cause the pawl 8 to swing outwardly. As a result of this operation, the nose or free end of the pawl 8 engages with an adjacent stop 10, thus preventing further rotation of the drum and catching or stopping the upward movement of the trolley pole. It will be noted that the co-action between the pawl 8 and stop 10 takes place when the drum is rotating rapidly under the influence of the trolley pole springs. The effect of their coöperation is to arrest the upward movement of the trolley pole very suddenly which is therefore caused to rebound. At this time the drum 3 has been stopped and the centrifugal force which acted upon the pawl 8, has ceased, leaving the spring 9 free to exert its influence upon the pawl 8 and the spring 4 to take up the slack in the rope A due to the rebound of the trolley pole.

If during the rebound of the trolley pole and the operation of the drum 3 under the influence of the spring 4 to take up the slack occurring in the rope A, the pawl 8 were allowed to return to its normal position, the trolley pole would have to move upwardly a considerable distance and beyond the point at which it was first arrested by the stop 10 before it would be again stopped. I therefore provide means, indicated at 11, for preventing the return of the pawl 8 during the rebound of the trolley pole. The means 11 maintain the pawl 8 in outward position ready to engage the same stop 10 in order that the pole will be locked against upward movement beyond the point where it was first arrested. The means 11 preferably comprise a guard or rib arranged adjacent to the outer end of the stop 10 to coöperate therewith. When the casing is provided with a series of stops 10, there is a co-acting guard 11 for each stop, as shown in the drawings. Each guard 11 is disposed at an angle to the adjacent stop and tangential to a circle which is concentric to the axis of the drum 3, it extending away from the stop in the general direction in which the drum moves when winding up the rope A. Each guard 11 projects at substantially right angles to the rear wall of the casing member 1ª and may be formed integral therewith and with the outer end of the adjacent stop 10. The free end of each guard 11 is preferably inclined or rounded to assist in directing the nose of the pawl 8 in position to engage the stop 10.

During the rebound of the trolley pole, after the pawl 8 and a stop 10 has arrested it, and the spring 4 is actuating the drum 3 in an anti-clockwise direction until the pole again swings upwardly under the influence of its spring, the nose of the pawl 8 will ride on the under face of the adjacent guard 11, this operation being represented by two positions in which the pawl 8 is shown in dotted lines. (See Fig. 2). When the pole again swings upwardly the pawl 8 will again engage the adjacent stop 10 and thus prevent further upward movement of the pole. As the interval of time occupied by the pole in rebounding is very short and the distance of travel of the drum 3 in anti-clockwise direction is also relatively short as compared with the length of rebound movement of the pole, I have found the guards 11 to be of sufficient length to maintain the pawl 8 in outward position while the pole is rebounding and until it again swings in the opposite direction. However, where it is found that the rebound of the pole takes a greater interval of time, the guards 11 may be made longer. The pawl 8 is preferably curved in order that it may engage any one of the stops 10 without contact with the adjacent guards. Each stop 10 and the adjacent guard 11 is spaced far enough from adjoining stops and guards to permit the quick and unobstructed operation of the pawl 8 under the influence of centrifugal force.

The operation of the pawl 8 is effected by means of few parts, all of which are preferably rigid with the casing member 1ª. My invention is therefore easily manufactured and lends itself for practical and efficient use under those conditions to which trolley mechanisms are usually subjected. The construction is also advantageous in that it permits the provision of a relatively large number of stops 10 around the axis of the drum 3. By this arrangement, the pawl 8 contacts with one of the stops 10 substantially instantly after the drum 3 has attained a high rotative speed and thus prevents an undue movement of the trolley pole upwardly after it has left the overhead wire.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In mechanism of the class described, the combination of supporting means, a drum, on which a rope connected to a trolley pole is wound and unwound, supported by the supporting means, means tending to rotate the drum to wind the rope thereon, means adapted to co-act when the rope is rapidly unwound from the drum, for stopping the rotation thereof, the said means comprising a pawl on the drum and a series of spaced stops on the supporting means, and a device arranged adjacent to each of said stops for maintaining the pawl in operative position relative thereto during rebound of the trolley pole.

2. In mechanism of the class described, the combination of supporting means, a drum, on which a rope connected to a trolley pole is wound and unwound, supported by the supporting means, means tending to rotate the drum to wind the rope thereon, means adapted to co-act when the rope is rapidly unwound from the drum, for stopping its rotation, the said means comprising a pawl on the drum and a series of spaced stops on the supporting means, and a device extending at an angle to each of said stops for maintaining the pawl in operative position relative thereto during rebound of the trolley pole.

3. In mechanism of the class described, the combination of supporting means, a drum, on which a rope connected to a trolley pole is wound and unwound, supported by the supporting means, means tending to rotate the drum to wind the rope thereon, means adapted to co-act when the rope is rapidly unwound from the drum, for stopping its rotation, the said means comprising a pawl on the drum and a series of spaced stops on the supporting means, and devices arranged adjacent to said stops and disposed tangentially to a circle concentric to the drum axis for maintaining the pawl in operative position relative to a stop during rebound of the trolley pole.

4. In a mechanism of the class described, the combination of supporting means, a drum, on which a rope connected to a trolley pole is wound and unwound, supported by the supporting means, means tending to rotate the drum to wind the rope thereon, and means adapted to co-act when the rope is rapidly unwound from the drum, for controlling its rotation, the said means comprising a pawl on the drum and sets of devices on the supporting means and spaced around the drum, each of said sets of devices operating independently of the remaining sets and serving first as a stop for the pawl and then as a guard therefor during the rebound of the trolley pole.

5. In mechanism of the class described, the combination with a rope adapted to be connected to a trolley pole, and a support, of a drum on which the rope is wound and unwound, means for rotating the drum to wind the rope thereon, and means for controlling the unwinding of said rope in opposition to said winding means, the said controlling means comprising a pawl on the drum and sets of devices on the support, each of said sets of devices operating independently of the remaining sets and serving first as a stop for the pawl and then as a guard therefor during the rebound of the trolley pole.

6. In mechanism of the class described, the combination with a rope adapted to be connected to a trolley pole, and a support, of a drum on which the rope is wound and unwound, means for rotating the drum to wind the rope thereon, and means for controlling the unwinding of said rope in opposition to said winding means, the said controlling means comprising a pawl on the drum and sets of devices on the support, each of said sets of devices operating independently of the remaining sets and serving first as a stop for the pawl and then as a guard therefor during the rebound of the trolley pole, the guard being disposed tangentially to a circle concentric to the axis of the drum.

7. In mechanism of the class described, the combination with a rope having a trolley pole connected thereto, and a support, of a drum on which the rope is wound and unwound, means for rotating the drum to wind the rope thereon, and means for controlling the unwinding of said rope in opposition to said winding means, the said controlling means comprising a pawl on the drum and sets of devices on the support, each of said sets of devices operating independently of the remaining sets and serving first as a stop for the pawl and then as a guard therefor during the rebound of the trolley pole, the free end of the guard being beveled.

8. In mechanism of the class described, the combination of supporting means, a drum mounted on said supporting means and adapted to have a trolley rope wound on it and unwound therefrom, means tending to rotate the drum in one direction, a pawl carried by the drum, a stop carried by the supporting means and arranged to be engaged by the pawl to stop the rotation of the drum, and a device for maintaining the pawl in operative position relative to said stop during rotation of said drum in rope winding direction immediately following the rebound of the trolley pole, the said device being carried by the supporting means and extending from the free end of said stop.

9. The combination of a drum adapted to have a trolley rope wound on it and unwound therefrom, means for rotating said drum in one direction, a centrifugal pawl carried by said drum, a casing supporting said drum and its rotating means and having a stop arranged to be engaged by said pawl, and a rib arranged adjacent to said stop for maintaining the pawl in operative relation to said stop during rotation of said drum in rope winding direction immediately following the rebound of the trolley pole.

In testimony whereof I affix my signature in the presence of two witnesses.

JOSEPH HOLLIS.

Witnesses:
GRACE M. BELL,
A. M. MCCARTY.